L. N. Tinkham.
Horse Hay-Fork.
N° 72567.  Patented Dec. 24, 1867.
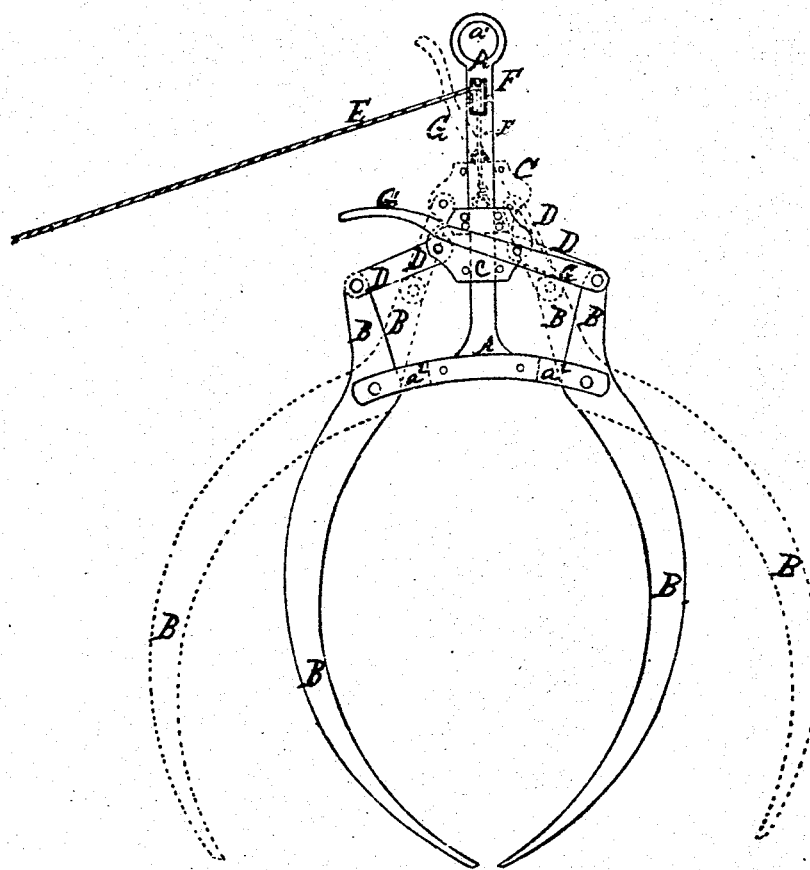
Witnesses.
Wm Trewin
J. Blockley
Inventor.
L N Tinkham
Per Murphy
Attorneys

United States Patent Office.

L. N. TINKHAM, OF SYLVANIA, PENNSYLVANIA.

Letters Patent No. 72,567, dated December 24, 1867.

IMPROVEMENT IN HORSE HAY-FORKS.

*The Schedule referred to in these Letters Patent and making part of the same.*

TO ALL WHOM IT MAY CONCERN:

Be it known that I, L. N. TINKHAM, of Sylvania, in the county of Bradford, and State of Pennsylvania, have invented a new and improved Hay-Fork; and I do hereby declare that the following is a full, clear, and exact description thereof, which will enable those skilled in the art to make and use the same, reference being had to the accompanying drawings, forming part of this specification, in which the figure is a side view of my improved hay-fork closed, and showing in red lines the position of the parts when open.

Similar letters of reference indicate corresponding parts.

My invention has for its object to furnish an improved horse hay-fork, simple in construction, easily operated, and effective in operation; and it consists in the combination of the tines, constructed as described, connecting-bars, slide, and standard, with each other, and in the combination of the lever or equivalent with the slide, connecting-bar, and tine; the whole being constructed and arranged as hereinafter more fully described.

A is the standard, in the upper end of which is formed, or to it is attached, an eye or ring, $a^1$, for the attachment of the rope by which the fork is elevated. To the lower end of the standard A is attached, or upon it is formed, a cross-head, $a^2$, to the ends of which are pivoted the tines B, which are made in substantially the form shown in the drawing. C is a slide moving freely up and down upon the standard A, and which is connected with the upper ends of the tines B by the connecting-bars D, the lower ends of which are pivoted to the upper ends of the tines B, and their upper ends to the ends of the slide C, so that by raising or lowering the said slide the points or lower ends of the tines may be moved from or towards each other, as may be desired. To the upper end of the slide C is attached an eye, to which is attached the end of a rope, E, which passes over a pulley, F, pivoted to the upper part of the standard B, and extends downwards, so as to be in a convenient position for operating the slide C to discharge the hay. G is a lever, which is pivoted to the slide C and tine B by the same pins by which the connecting-bar D is pivoted to said tine and slide, and the upper end of which extends up into such a position that it may be operated by the operator with his hand or foot, as may be convenient. One or more pairs of tines may be used, as may be desired, all the tines upon the same side being rigidly connected together, so as to be operated at the same time by the same connecting-bar and slide.

In using the fork, as the tines B are forced down into the hay or straw, the peculiar form of the tines causes their points to approach each other, and when they have entered to a sufficient depth, the operator, by pressing down the slide C by means of the lever G, so as to bring the connecting-bars D into a line with each other, locks the fork, so that it will raise and carry the hay and hold it suspended until released by raising the slide C by means of the rope E.

I claim as new, and desire to secure by Letters Patent—

The combination of the lever G, or its substantial equivalent, with the slide C, connecting-bar D, and tines, B, substantially as herein shown and described, and for the purpose set forth.

The above specification of my invention, signed by me, this 7th day of May, 1867.

L. N. TINKHAM.

Witnesses:
STEPHEN HOOVER,
PETER MONRO.